United States Patent
Ohmori et al.

(10) Patent No.: US 8,539,167 B2
(45) Date of Patent: Sep. 17, 2013

(54) SHARED MEMORY DEVICE

(75) Inventors: Mutsuhiro Ohmori, Kanagawa (JP); Motofumi Kashiwaya, Tokyo (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 11/892,722

(22) Filed: Aug. 27, 2007

(65) Prior Publication Data
US 2008/0071996 A1 Mar. 20, 2008

(30) Foreign Application Priority Data
Sep. 19, 2006 (JP) ................. 2006-252390

(51) Int. Cl.
*G06F 12/00* (2006.01)
(52) U.S. Cl.
USPC .......................... 711/151; 710/305
(58) Field of Classification Search
USPC ................. 711/148, 151; 710/305
See application file for complete search history.

(56) References Cited

U.S. PATENT DOCUMENTS

| | | | |
|---|---|---|---|
| 5,471,592 A | 11/1995 | Gove et al. | |
| 6,055,605 A * | 4/2000 | Sharma et al. | 711/130 |
| 6,122,714 A * | 9/2000 | VanDoren et al. | 711/150 |
| 2004/0073772 A1* | 4/2004 | Hokenek et al. | 712/1 |

FOREIGN PATENT DOCUMENTS

| | | |
|---|---|---|
| JP | 03-177958 A | 8/1991 |
| JP | 11-195766 A | 7/1999 |
| JP | 2001-338492 A | 12/2001 |
| JP | 2001-344222 A | 12/2001 |

OTHER PUBLICATIONS

K. Hwang et al., OMP: A RISC-based Multiprocessor using Orthogonal-Access Memories and Multiple Spanning Busses, 1990, ACM.*
Bruno R. Preiss, Effective Memory Bandwidth of Band-Connected Partial Crossbars, 1987, Department of Electrical Engineering University of Waterloo.*

* cited by examiner

*Primary Examiner* — Kalpit Parikh
(74) *Attorney, Agent, or Firm* — Rader, Fishman & Grauer PLLC

(57) ABSTRACT

A shared memory device is disclosed which includes: a plurality of processor elements; a plurality of memory modules configured to be accessible by the plurality of processor elements; and a connection device configured to enable a specific processor element out of the plurality of processor elements to access a specific memory module out of the plurality of memory modules; wherein the plurality of processor elements are allowed to access via the connection device a plurality of memory systems each constituted by at least one memory module; and wherein each of the plurality of memory systems accessible by different processor elements allows the plurality of memory modules to be partially shared and accessed by the different processor elements.

10 Claims, 12 Drawing Sheets

SHARED MEMORY DEVICE

CROSS REFERENCES TO RELATED APPLICATIONS

The present invention contains subject matter related to Japanese Patent Application JP 2006-252390 filed with the Japan Patent Office on Sep. 19, 2006, the entire contents of which being incorporated herein by reference.

BACKGROUND OF THE INVENTION

1. Field of the Invention

The present invention relates to a shared memory device which incorporates a plurality of memory systems each composed of memories, together with processing capabilities such as processor elements (PE) that share some of the memories in the memory systems.

2. Description of the Related Art

A system that includes a plurality of memory systems may adopt an architecture such as one shown in FIG. 1 which stresses parallel processing.

In the setup of FIG. 1, PEs (processor elements) 1-1 through 1-4 are connected to memories 2-1 through 2-4 on a one-to-one basis placing priority on parallel processing.

In this structure, each PE 1 is connected to the corresponding memory 2 in a manner promoting parallel processing. When referencing data located in an adjacent PE, any PE is required to go through a path via a host device in order to reach the destination.

The detour by way of the host device is avoided illustratively by adopting a structure that includes a crossbar (X-bar) 3 as shown in FIG. 2. A typical crossbar structure is described in U.S. Pat. No. 5,471,592.

SUMMARY OF THE INVENTION

In the multiple-PE system outlined above, memory-to-processor connections may be multiplied on an efficiently scalable basis with a view to sharing data between the memories involved. In this case, as shown in FIG. 3, the connections are not increased linearly but precipitously with regard to the growing number of PEs configured.

Prior to U.S. Pat. No. 5,471,592, "Multi-processor with crossbar link of processors and memories," shared memory systems used to operate typically under either the SIMD (single instruction multiple data stream) or the MIMD (multiple instruction multiple data stream) scheme. Since then, the need to implement complicated applications has required memory systems to incorporate these two features altogether. A number of basic techniques for supporting such implementations have been proposed.

Efficient multi-PE processing is supposedly implemented not by transferring data but by changing the destinations of PE-to-memory connections. The following three kinds of connections are generally involved:

Global connections permitting access to all memories;
Local connections connectable to specific PEs; and
Instruction transfer paths through which to transfer PE execution instructions.

A crossbar switch arrangement has mechanisms for prioritizing vertical connections each connected to each of the memories installed. The connections are determined on a round-robin basis.

This method, however, has no consideration for cases in which a large number of configured PEs result in an enormous number of crossbar connections. No countermeasures have been proposed to deal with this problem.

A hierarchical structure of data transfer paths has been proposed to minimize the increase of these paths where the number of PEs has grown, as shown in FIGS. 4A and 4B. This measure requires adding redundant features irrelevant to data transfer, such as a connection port setup for supporting the hierarchical structure.

The present invention has been made in view of the above circumstances and provides a shared memory device capable of expanding the connections of a plurality of processors through memories on an efficiently scalable basis.

In carrying out the present invention and according to one embodiment thereof, there is provided a shared memory device including: a plurality of processor elements; a plurality of memory modules configured to be accessible by the plurality of processor elements; and a connection device configured to enable a specific processor element out of the plurality of processor elements to access a specific memory module out of the plurality of memory modules; wherein the plurality of processor elements are allowed to access via the connection device a plurality of memory systems each constituted by at least one memory module; and wherein each of the plurality of memory systems accessible by different processor elements allows the plurality of memory modules to be partially shared and accessed by the different processor elements.

Preferably, the plurality of memory systems may be structured in such a manner that the processor elements located close to each other can access the shared memory modules.

Preferably, the shared memory device according to the present invention may further include an arbitration circuit configured to prioritize simultaneous requests from a plurality of processor elements to access any one memory module and to let the requesting processor elements access the memory module in question in the prioritized order.

Preferably, the shared memory device of the present invention may further include a controller configured to communicate with an external entity and to control access to the plurality of memory modules, wherein the controller can access all memory modules via the connection device.

According to another embodiment of the present invention, there is provided a shared memory apparatus having a plurality of shared memory devices each including: a plurality of processor elements; a plurality of memory modules; a connection device configured to enable a specific processor element out of the plurality of processor elements to access a specific memory module out of the plurality of memory modules; and a controller configured to communicate with an external entity and to control access to the plurality of memory modules; wherein the plurality of processor elements are allowed to access via the connection device a plurality of memory systems each constituted by at least one memory module; wherein each of the plurality of memory systems accessible by different processor elements allows the plurality of memory modules to be partially shared and accessed by the different processor elements; and wherein the controllers of the plurality of shared memory devices are connected by a bus arrangement.

According to a further embodiment of the present invention, there is provided a shared memory device including: a plurality of processor elements; a plurality of memory systems each made up of at least one memory module accessible by the plurality of processor elements; and a plurality of interfaces connected to the plurality of processor elements and to the plurality of memory modules; wherein the plurality of processor elements can access the plurality of memory systems each formed by at least one memory module;

wherein each of the plurality of memory systems accessible by different processor elements allows the plurality of memory modules to be partially shared and accessed by the different processor elements; and wherein bus wiring is mapped over the plurality of memory systems.

Preferably, the plurality of memory interfaces may be located opposite to the plurality of processor elements across the plurality of memory systems; wherein the plurality of memory modules constituting the plurality of memory systems may be parallelly arrayed in a second direction substantially perpendicular to a first direction in which the plurality of memory interfaces are located opposite to the plurality of processor elements; and wherein the plurality of processor elements, the plurality of memory interfaces, and the plurality of memory modules may be connected by connection wiring arranged in matrix fashion in the first and the second directions over the plurality of memory systems.

Preferably, the inventive shared memory device may further include a common bus wired in the second direction.

According to the present invention, as outlined above, a plurality of processor elements gain access to the memory modules constituting the memory systems by way of the connection device. In this setup, each of the memory systems accessible by different processor elements allows the memory modules to be partially shared and accessed by the different processor elements.

That is, the inventive memory device is structured so as to connect a plurality of processor elements through memories on an efficiently scalable basis.

DETAILED DESCRIPTION OF THE PREFERRED EMBODIMENTS

Preferred embodiments of the present invention will now be described in reference to the accompanying drawings.

Figure 1:
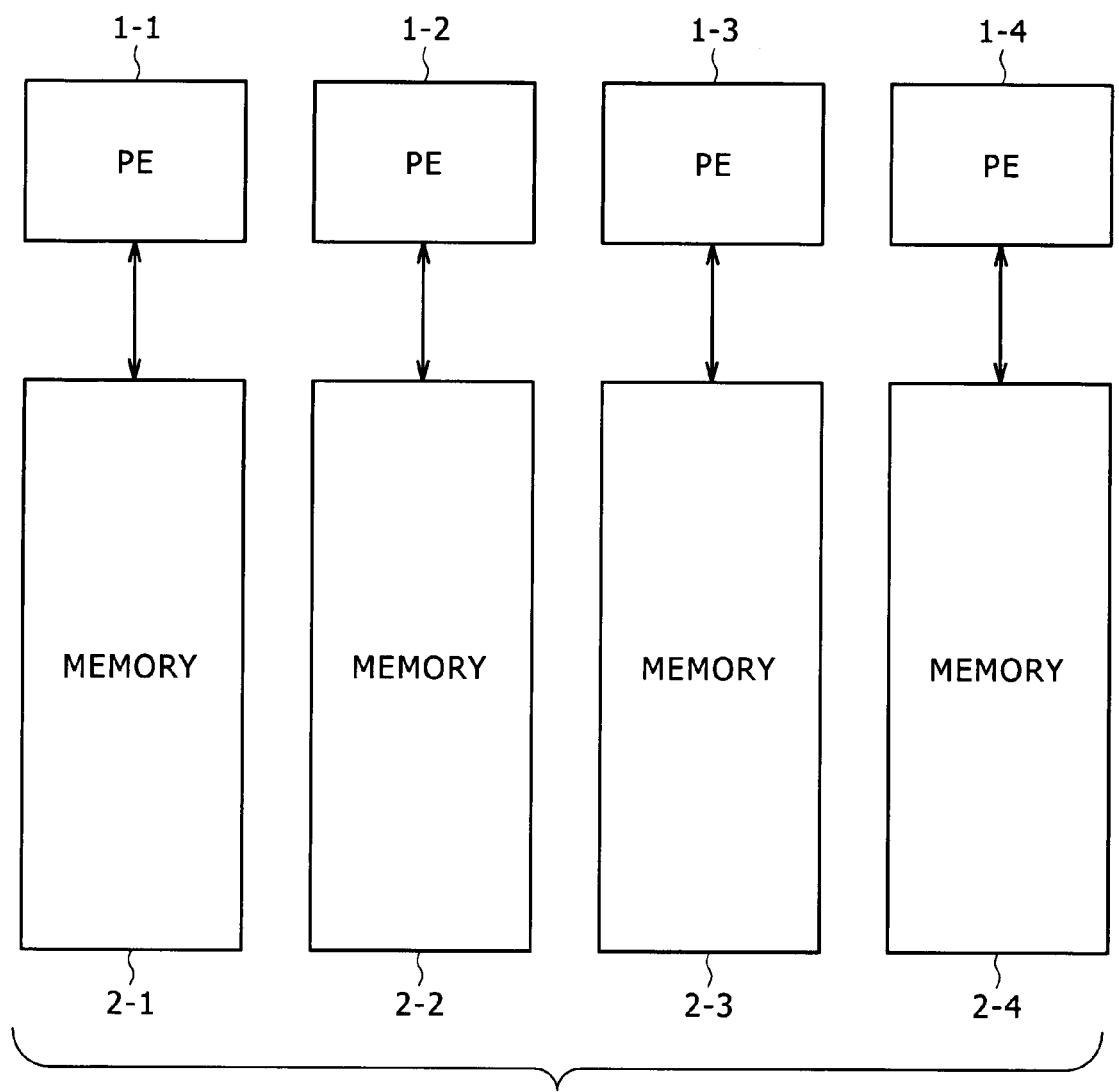
FIG. 1 is a schematic view showing a typical architecture of a multi-processor setup.
Figure 2:
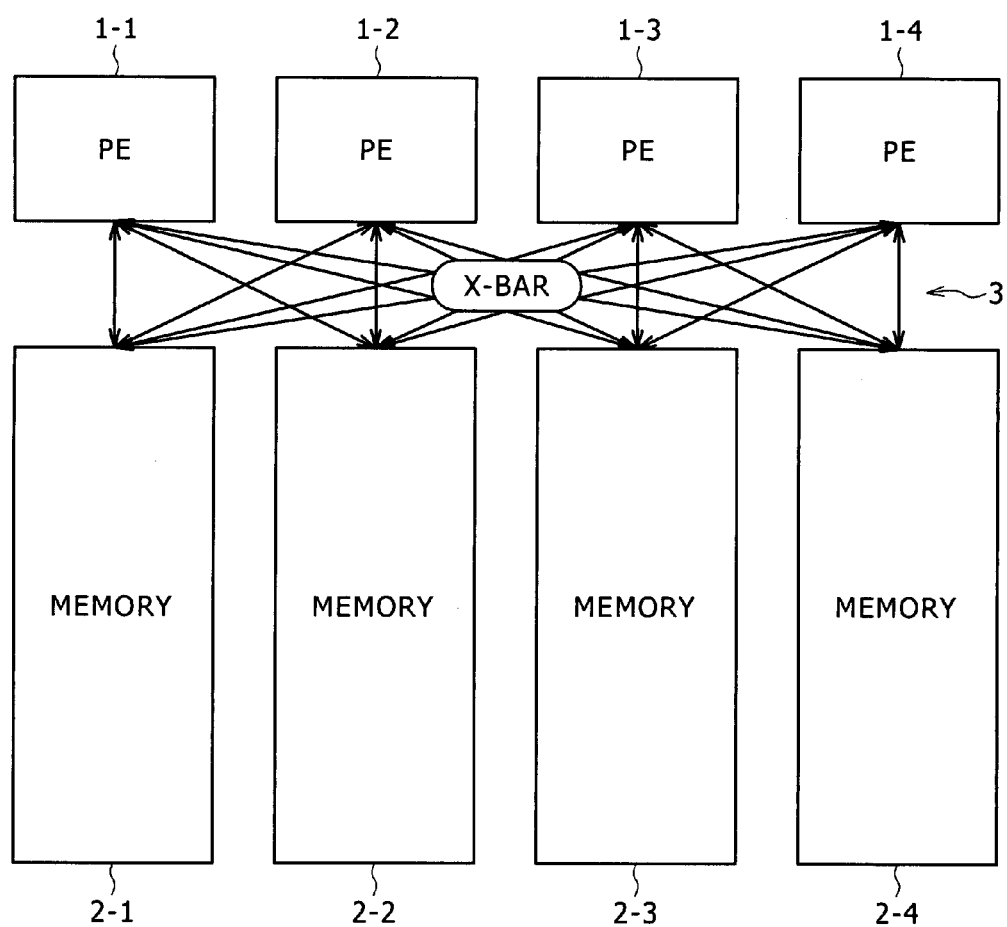
FIG. 2 is a schematic view showing a typical architecture of a crossbar-equipped multi-processor setup.
Figure 3:
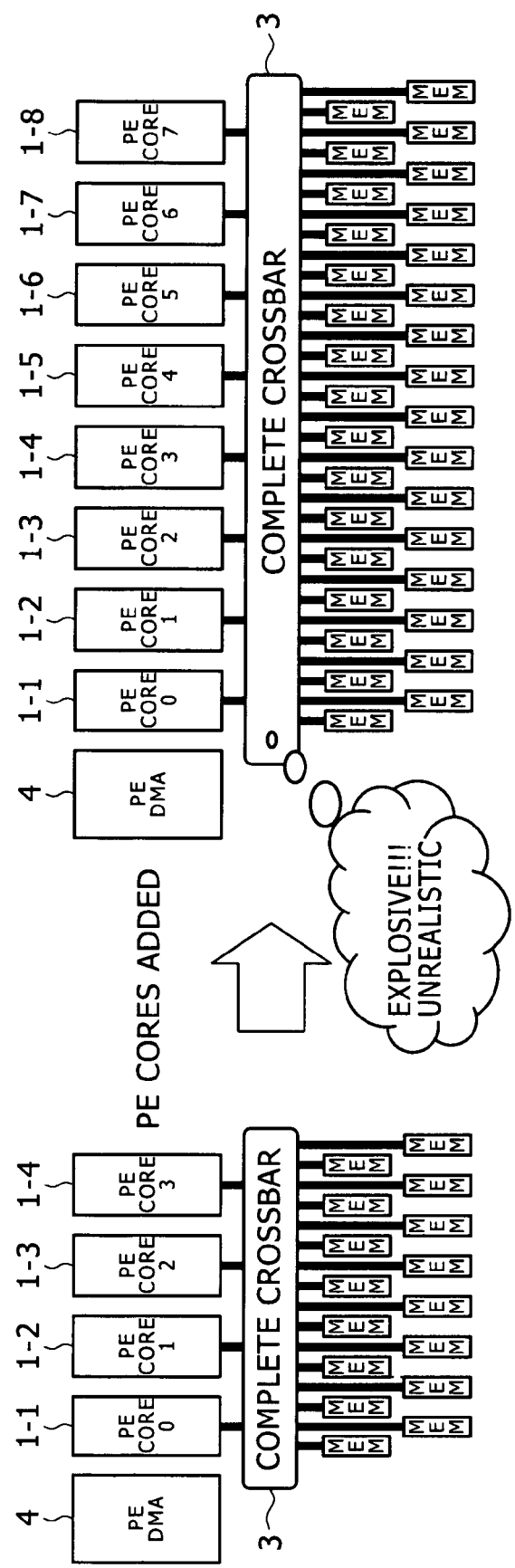
FIG. 3 is a schematic view explanatory of the challenges encountered upon processor element (PE) expansion.
Figure 4A:
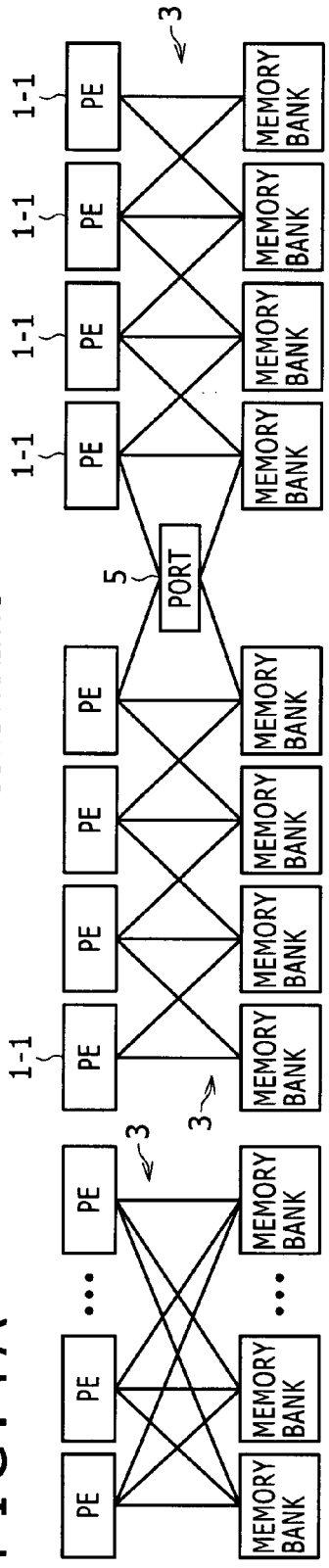
FIGS. 4A and 4B are schematic views showing typical structures that use port arrangements to minimize the increase of data transfer paths upon PE expansion.
Figure 4B:
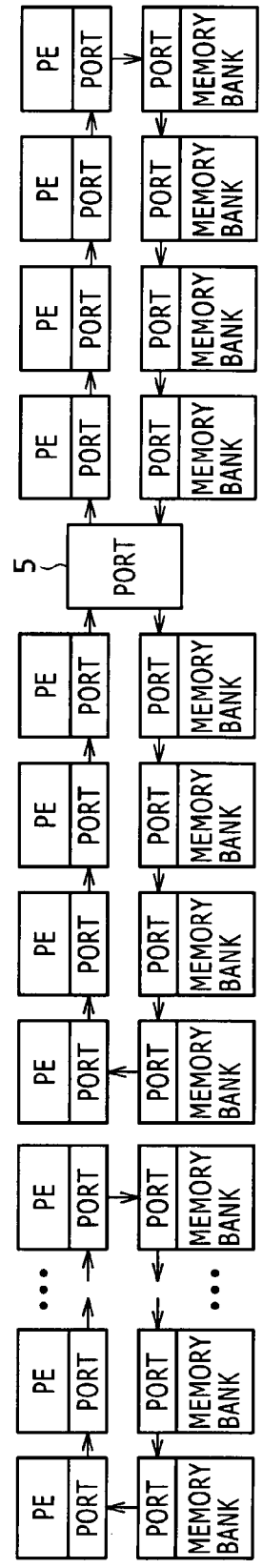
Figure 5:
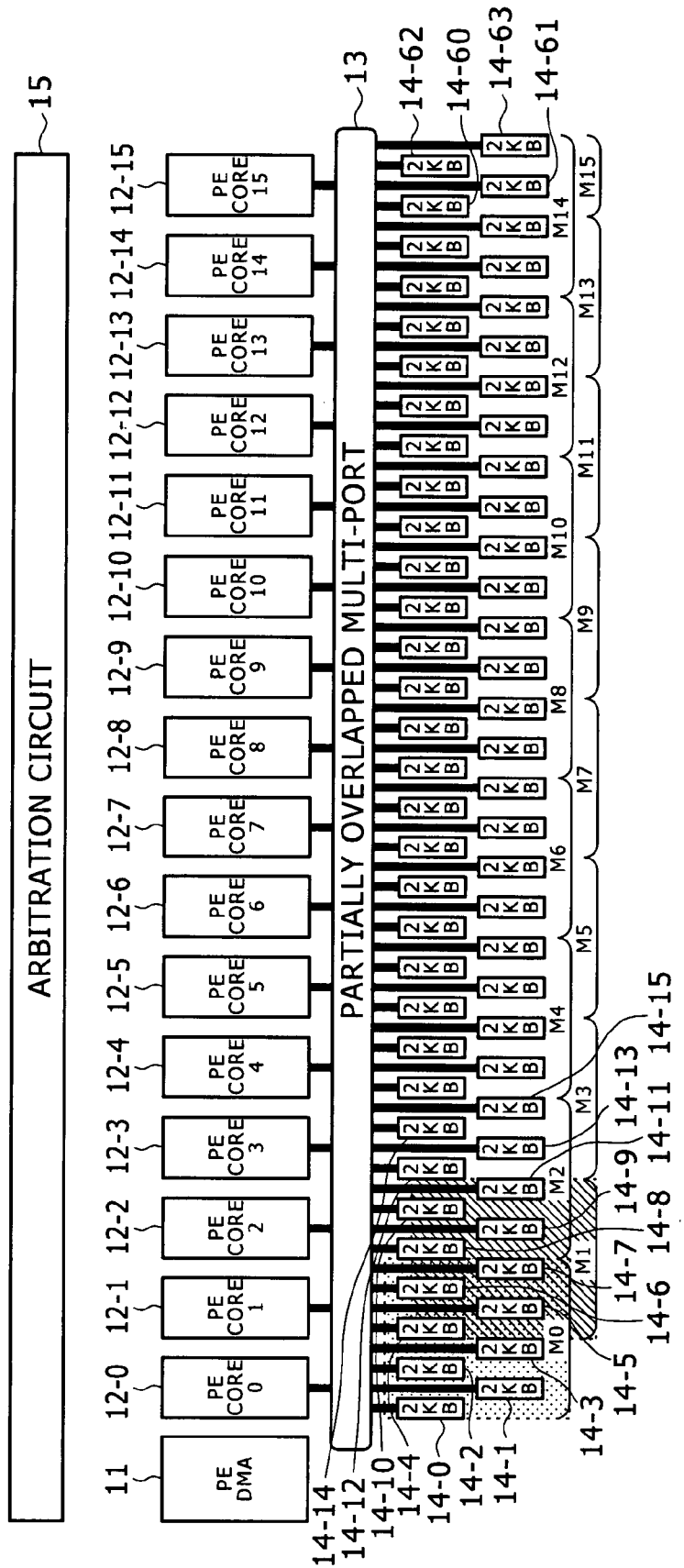
FIG. 5 is a schematic view showing a system configuration of a shared memory device embodying the present invention.

FIG. 5 is a schematic view showing a system configuration of a shared memory device embodying the present invention.

In FIG. 5, the shared memory device 10 has a direct memory access (DMA) controller 11, a plurality of (e.g., 16) PE cores 12-0 through 12-15, a partially overlapped multi-port device (called the overlapped multi-port device hereunder) 13, a plurality of (e.g., 64) memory modules making up memory banks (e.g., SRAM banks) 14-0 through 14-63, and an arbitration circuit 15.

In the shared memory device 10 of FIG. 5, the memory banks 14-0 through 14-63 are divided into a plurality of memory systems M0 through M15 each made up of contiguously formed eight banks. Illustratively, the memory system M0 is constituted by eight memory banks 14-0 through 14-7. The memory system M1 adjacent to the memory system M0 is formed by eight memory banks 14-4 through 14-11 and shares four memory banks 14-4 through 14-7 with the memory system M0. Likewise, the memory system M2 adjacent to the memory system M1 is composed of eight memory banks 14-8 through 14-15 and shares four memory banks 14-8 through 14-11 with the memory system M1.

In this manner, the memory systems M3 through M15 are each constituted by eight memory banks including four memory banks that are shared with the adjacent memory system.

Only the memory system M15 is made up of four memory banks.

In the shared memory device 10 of FIG. 5, each of the PE cores 12-0 through 12-15 is allowed illustratively to access eight banks (16 kilobytes). Each of the memory banks accessible by the PE cores 12-0 through 12-15 has eight kilobytes shared between a plurality of PEs such as those adjacent to each other. This is not a complete crossbar connection setup. With part of the memory banks left unconnected, concurrent attempts to access any given SRAM bank are resolved through arbitration.

Although any one PE core attempting simultaneously to access SRAM banks beyond the directly accessible memory banks can reduce efficiency, the number of shared memory banks may be so established as to make such an eventuality a rare case. This makes it possible to prevent any drop in data transfer efficiency at this point from contributing significantly to a decrease in overall system efficiency.

Figure 6:
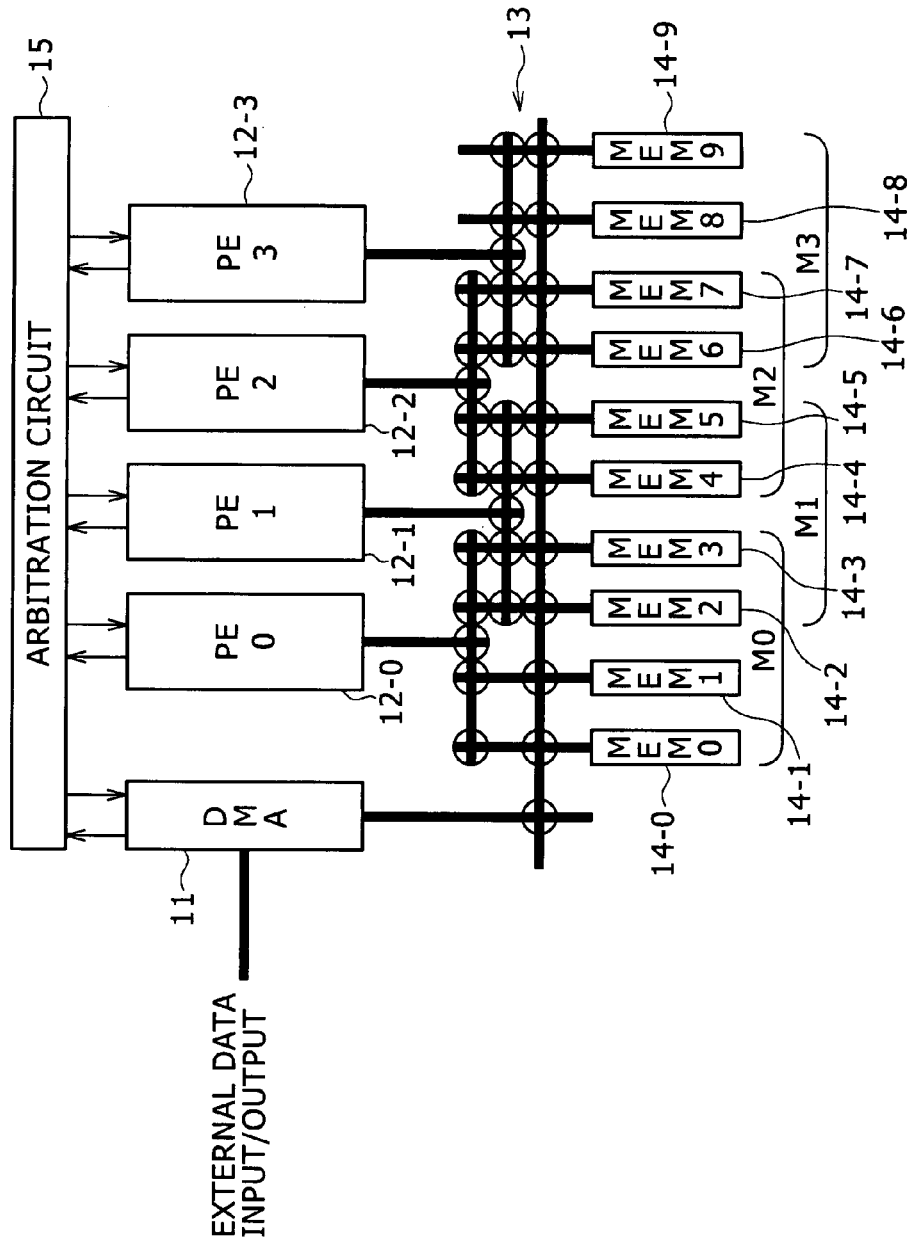
FIG. 6 is a schematic view showing typical connections of signal paths in the shared memory device embodying the invention.

FIG. 6 is a schematic view showing typical connections of signal paths in the shared memory device embodying the present invention.

In FIG. 6, each of the memory systems configured is made up of four memory banks for purpose of simplification and illustration.

A memory system M0 is constituted by memory banks 14-0 through 14-3; a memory system M1 by memory banks 14-2 through 14-5; a memory system M2 by memory banks 14-4 through 14-7; and a memory system M3 by memory banks 14-6 through 14-9.

In the shared memory device 10A of FIG. 6, each of PE cores 12-0 through 12-3 has paths for access to the four memory banks. Where any given pair of PE cores share two memory banks, a PE core 12-$n$ has access to memory banks MEM(2×n), MEM(2×n+1), MEM(2×n+2), and MEM(2×n+3); and the PE core 12-$n$ and a PE core 12-$n$+1 share MEM(2×n+2) and MEM(2×n+3) therebetween.

In the shared memory device 10A of FIG. 6, a DMA controller 11 has access to all memory banks 14-0 through 14-9 via an overlapped multi-port device 13.

The PE core 12-0 may have access to the memory banks 14-0 through 14-3.

The PE core 12-1 to the memory banks 14-2 through 14-5.

The PE core 12-2 to the memory banks 14-4 through 14-7.
The PE core 12-3 to the memory banks 14-6 through 14-9.

In the above embodiment of the invention, the transfer of data from the outside for initial processing by a PE core is implemented by the DMA controller 11. A typical method for carrying out such data transfer using the DMA controller 11 is described below.

Where data from the outside is to be transferred to a specific memory bank or where data is to be output from a specific memory bank to the outside, one of the PE cores 12-0 through 12-3 sends a data transfer request to the DMA controller 11. In turn, the DMA controller 11 sends to an arbitration circuit 15 the request to transfer the data to designated addresses and waits for permission for the transfer.

When the permission is accorded by the arbitration circuit 15, the DMA controller 11 connects an external data bus with the specific memory bank. The DMA controller 11 proceeds to control transfer of the data while outputting the designated addresses one after another to bring about data transmission between the external data bus and the memory bank.

What follows is a description of how data may be shared and transferred between PEs. In FIG. 6, the data input to the PE cored 12-0 is placed in the memory bank 14-0. The PE core 12-0 reads and processes what is contained in the memory 14-0. The result of the process is output to the memory banks 14-2 and 14-3.

After outputting significant data to the memory bank 14-2 or 14-3, the PE core 12-0 turns on a significance check bit at a particular address A-1 in the memory bank 14-2.

After completing its own process, the PE core 12-1 checks to determine whether the PE core 12-0 has turned on address A-1. If address A-1 is found to be on, the PE core 12-1 starts reading the data from the memory bank 14-2 or 14-3 and operates on the retrieved data.

The PE core 12-1 inputs and processes the data placed in the memory banks 14-2 and 14-3 and outputs the result of the process to the memory bank 14-4. After completing its own process, the PE core 12-2 sends to the DMA controller 11 a request to transfer data to the outside. In turn, the DMA controller 11 outputs the significant data from the memory bank 14-4 to the outside over an external bus.

The PE cores 12-0 through 12-3 transfer data to and from the memory banks as follows: each of the PE cores sends a data transfer request address to the arbitration circuit 15. In turn, the arbitration circuit 15 prioritizes the other PE cores and the DMA controller on a round-robin basis and grants the requesting PE core permission to transfer data.

Figure 7:
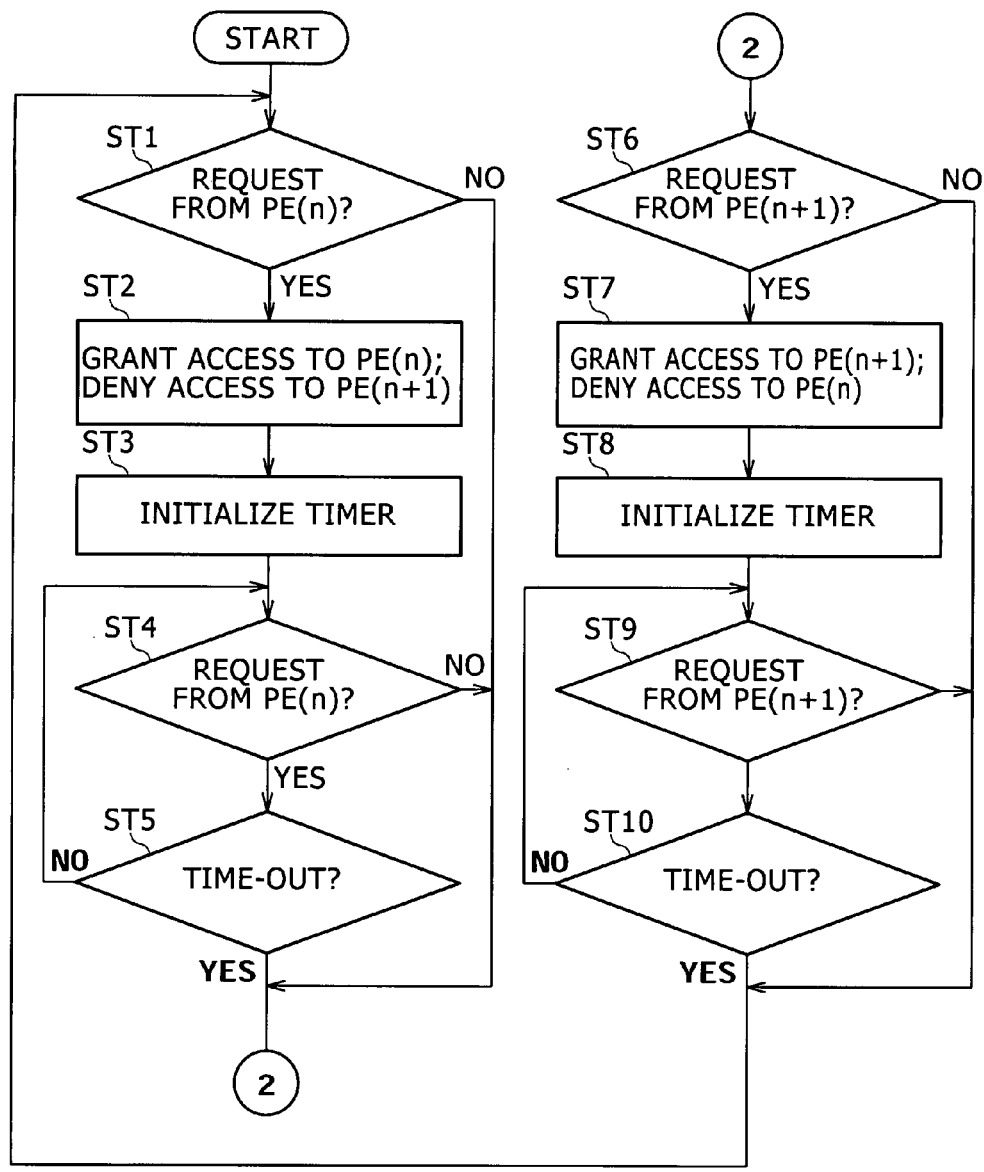
FIG. 7 is a flowchart of steps constituting an access arbitration process for arbitrating the access of PE(n) and PE(n+1) to a memory bank MEM(2n)

FIG. 7 is a flowchart of steps constituting an access arbitration process for arbitrating the access of PE(n) and PE(n+1) to a memory bank MEM(2n). What follows is a description of this access arbitration process. In the ensuing description, reference character "PE" stands for the PE core.

The process is started immediately after the chip is reset. In step ST1, a check made to determine whether PE(n) has requested access to MEM(2n). If no such request is found, then control is passed on to step ST6 and a check is made to see if PE(n+1) has requested access to MEM(2n).

If in step ST1 PE(n) is found to have requested access to MEM(2n), then step ST2 is reached. In step ST2, PE(n) is granted access to MEM(2n) and PE(n+1) is denied access to MEM(2n).

In step ST3, a counter for counting a predetermined time period is initialized. Following the initialization, the counter starts a count-down. In step ST4, a check is made again to determine whether PE(n) has requested access to MEM(2n). As long as a time-out is not detected from the count on the timer in step ST5, the check is repeated to see if the request from PE(n) for access to MEM(2n) persists. If in step ST5 the time-out is detected, then step ST6 is reached.

Steps ST6 and subsequent steps are similar to the steps outlined above. In step ST6, a check is made to determine whether PE(n+1) has requested access to MEM(2n). If no such request is detected, then step ST1 is again reached and a check is made to see if PE(n) has requested access to MEM(2n).

If in step ST6 PE(n+1) is found to have requested access to MEM(2n), then step ST7 is reached. In step ST7, PE(n+1) is granted access to MEM(2n) and PE(n) is denied access to MEM(2n).

In step ST8, the counter for counting the predetermined time period is initialized. Following the initialization, the counter starts a count-down. In step ST9, a check is made again to determine whether PE(n+1) has requested access to MEM(2n). As long as a time-out is not detected from the count on the timer in step ST10, the check is repeated to see if the request from PE(n+1) for access to MEM(2n) persists. If in step ST10 the time-out is detected, then control is returned to the start phase.

Figure 8:
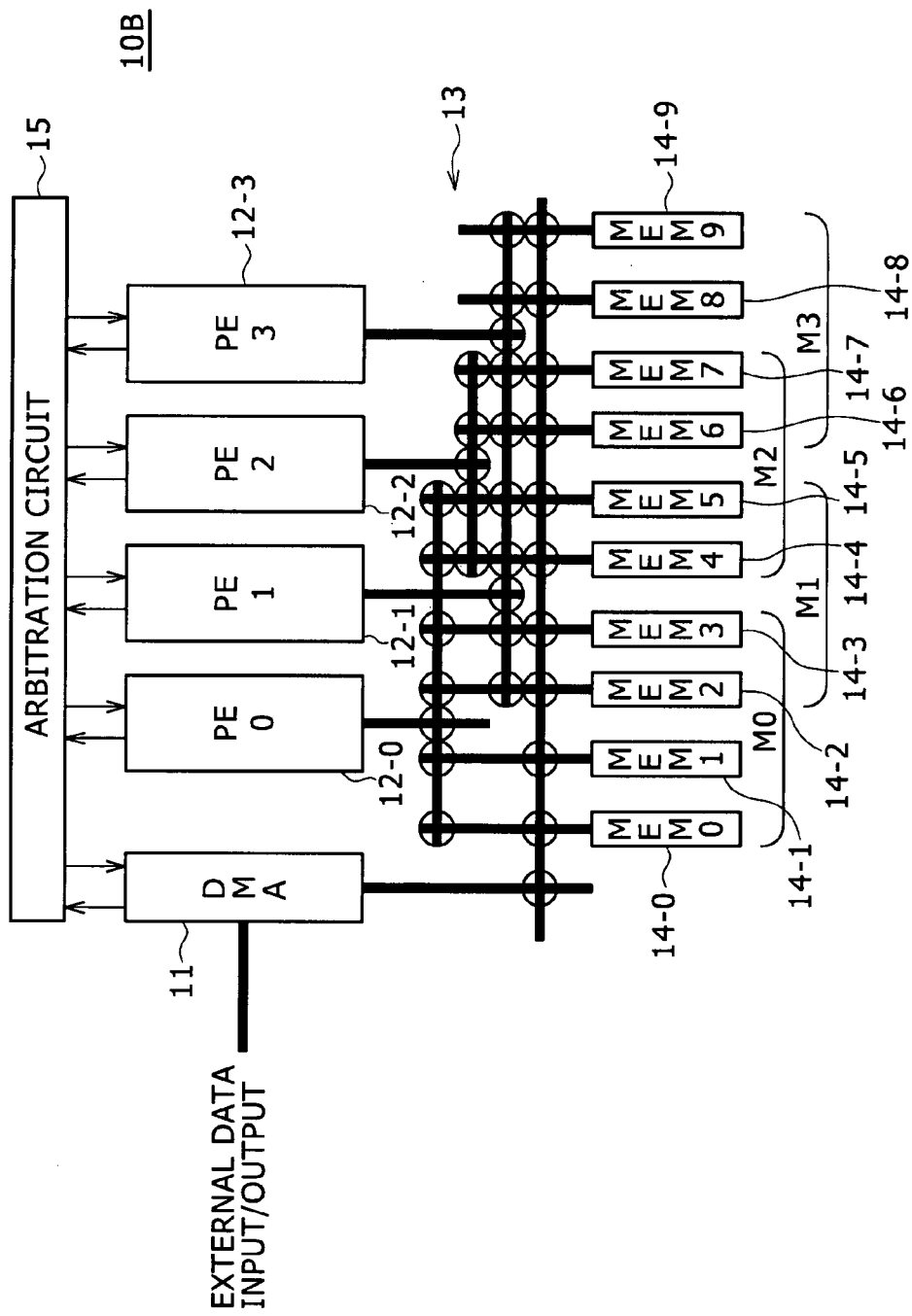
FIG. 8 is a schematic view showing a shared memory device in which three or more PE cores are allowed to access one memory bank.

FIG. 8 is a schematic view showing a shared memory device in which three or more PE cores are allowed to access one memory bank.

What follows is a description of this setup in which three or more PE cores are granted access to a single memory bank.

The shared memory device 10B in FIG. 8 has a memory system M0 made up of six memory banks 14-0 through 14-5.

From the viewpoint of memory units (i.e., memory banks), there is no need to keep constant the number of arithmetic units such as PE cores gaining access to each of the memory units configured.

In the setup of FIG. 8, the PE core 12-0 may have access to the memory banks 14-0 through 14-5.

The memory bank 14-1 may be accessed by the three PE cores 12-0, 12-1 and 12-2.

The memory bank 14-6 may be accessed by the PE cores 12-2 and 12-3.

The above setup is not characterized by the simple overlapping formula. Although the setup has four processing units (i.e., PE cores) and ten memory units (memory banks), these numbers are not limitative of the present invention but are given specifically for illustration purposes.

Figure 9:
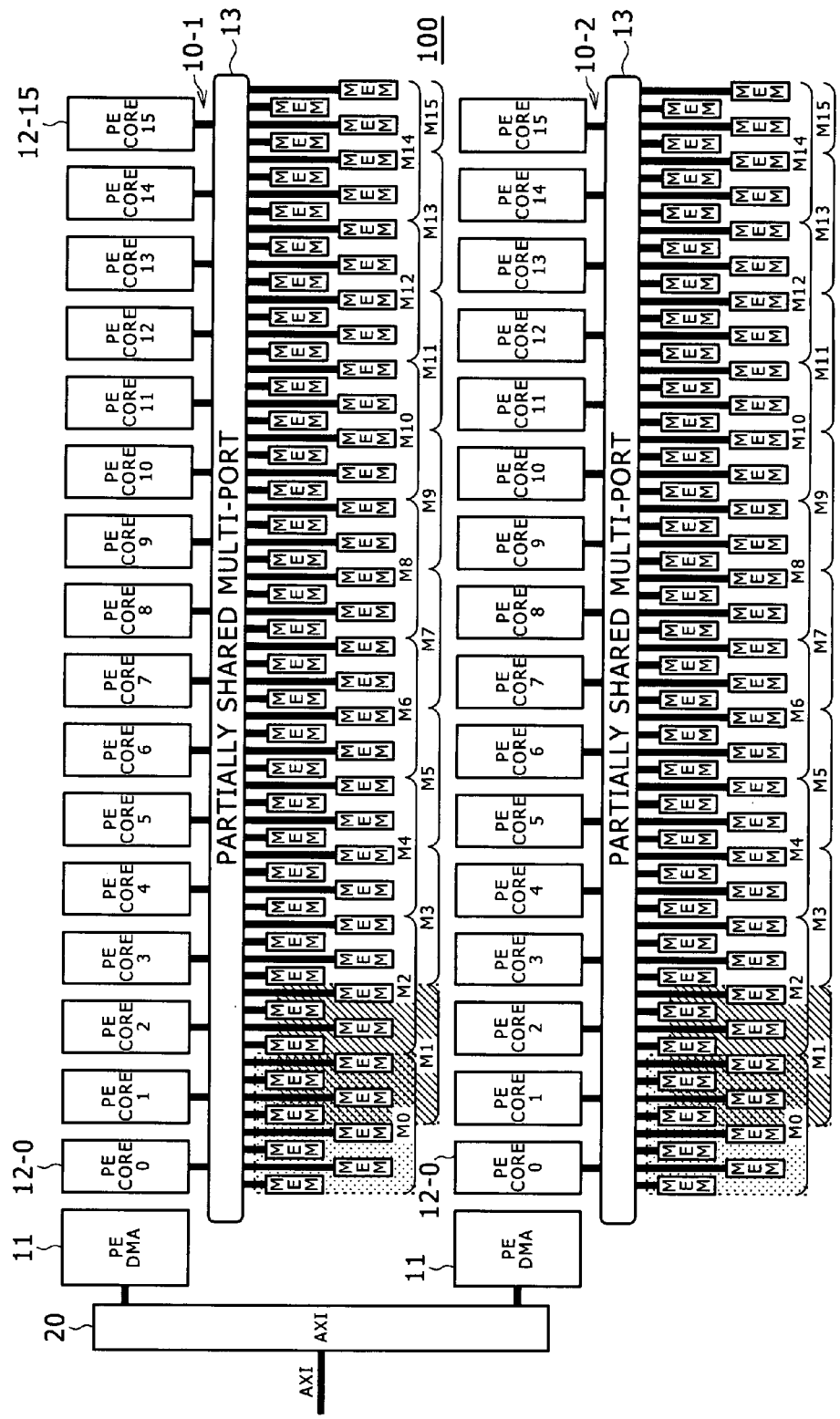
FIG. 9 is a schematic view explanatory of how a partially shared multi-port PE arrangement is expanded hierarchically.

FIG. 9 is a schematic view explanatory of how a partially shared multi-port PE arrangement is expanded hierarchically.

What follows is a description of how to make the hierarchical expansion where DMA transfer turns out to be a bottleneck.

Any drop in performance due to contention during mass data transfer between PE cores can be alleviated significantly. However, the probability of the contention can increase where PE cores handle a plurality of functions simultaneously during data transfer between the outside and the memory banks.

Such an eventuality is dealt with illustratively by putting the PE array in a hierarchical structure as shown in FIG. 8.

As with the basic structure of FIG. 5, the PE array is made up of layers each constituted by 16 PEs and one DMA controller. The layers are interconnected by an AXI (Advanced Extensible Interface) bus 20 to form a memory device 100.

What is important in this setup is to minimize the number of such AXI-connected PE layers. The present invention proposes arrangements contributing to minimizing the layer count.

Figure 10:
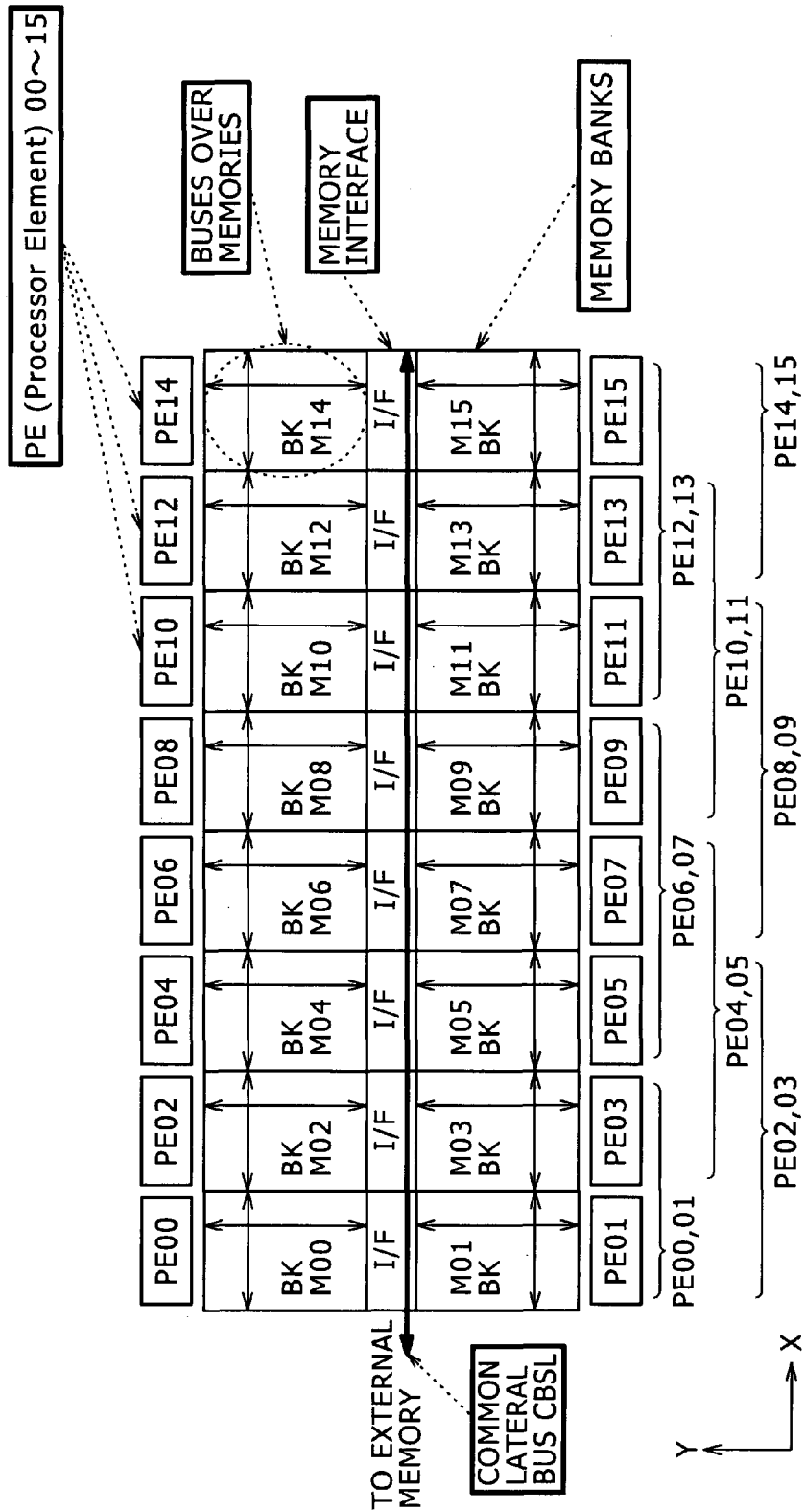
FIG. 10 is a schematic view showing how memory banks are mapped physically by bus wiring (bus mapped memory)

FIG. 10 is a schematic view showing how memory banks are mapped physically by bus wiring (bus mapped memory).

Figure 11:
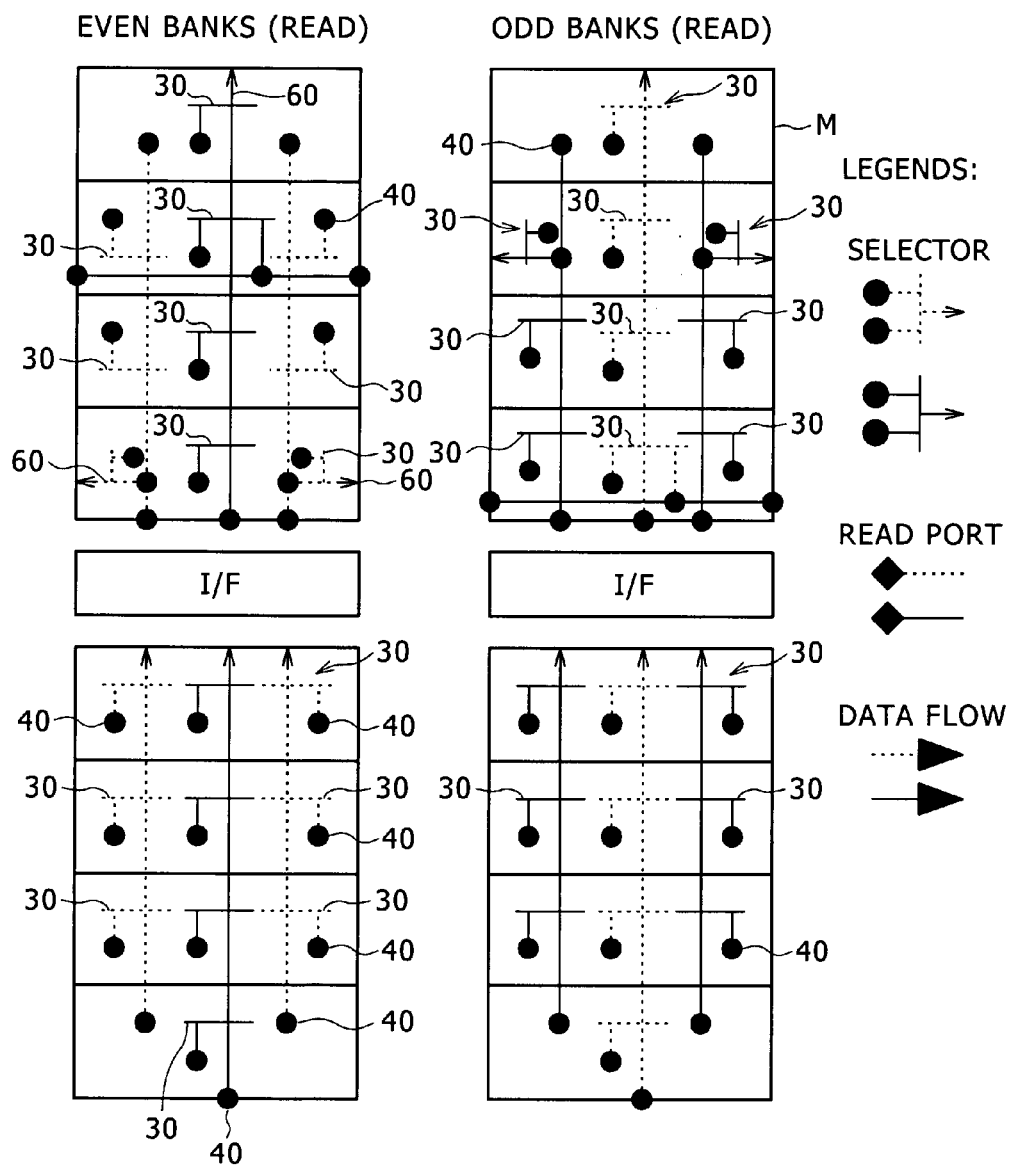
FIG. 11 is a schematic view showing how the read blocks of a bus mapped memory are typically wired.
Figure 12:
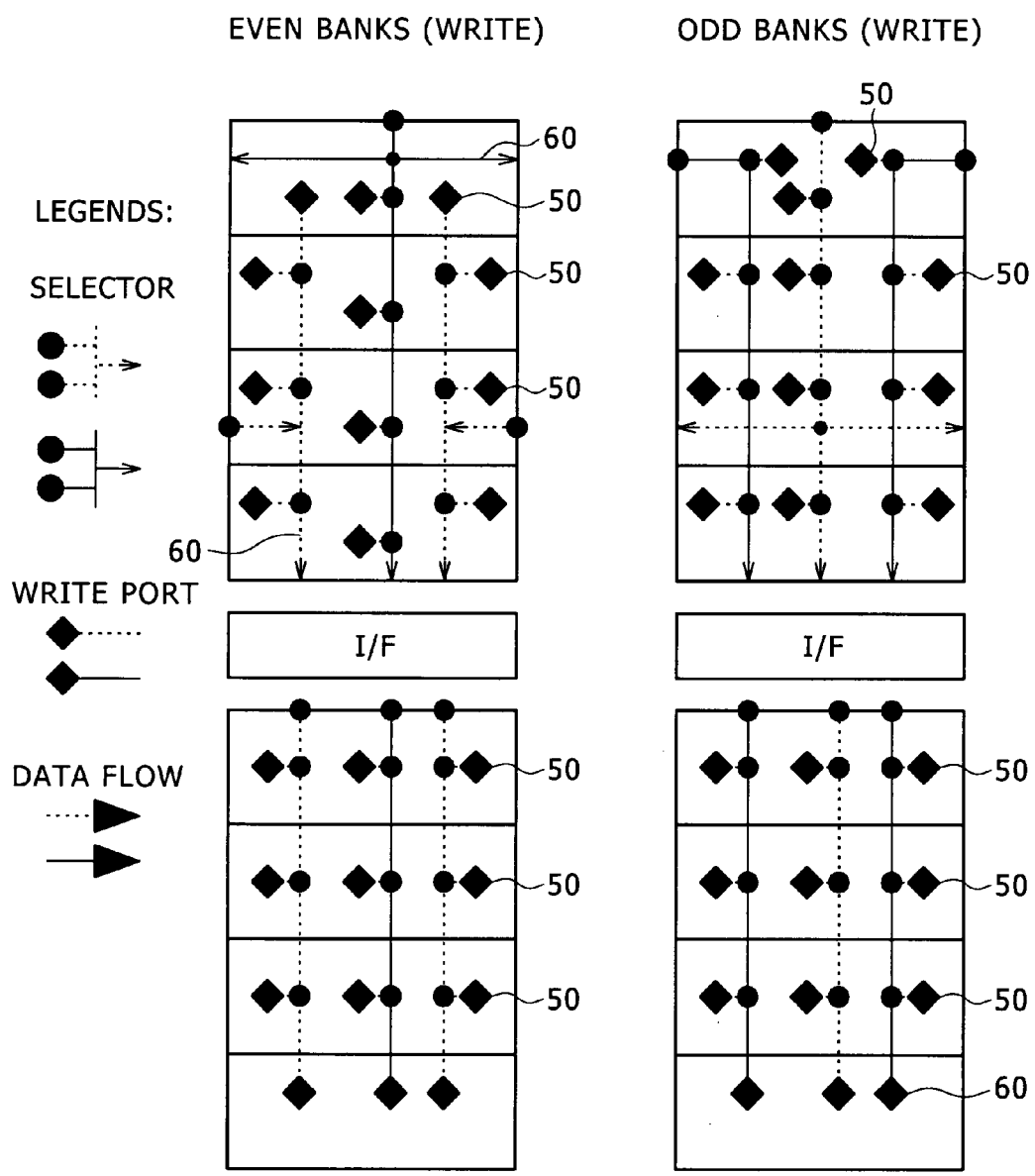
FIG. 12 is a schematic view showing how the write blocks of the bus mapped memory are typically wired.

FIGS. 11 and 12 illustrate how a typical bus mapped memory is wired. FIG. 11 schematically depict how the read blocks of the bus mapped memory are typically wired. FIG. 12 is a schematic view showing how the write blocks of the bus mapped memory are typically wired.

Described below in reference to FIG. 10 are a typical structure and an accessible range of the bus mapped memory.

Memory systems M00 through M15 each made up of one or more memory banks (illustrated) are the units that make up the memory. A bus structure is laid out over the memory systems. The buses are constituted by unused wiring layers on the memory banks.

The memory systems M00 through M15 are symmetrically located on both sides of memory interfaces IF00 through IF07. PE cores are positioned external to and on both sides of the memory systems M00 through M15. A minimum system configuration consists of two PEs, two memory systems (memory banks), and one memory interface.

This system is perfectly scalable and can be expanded laterally and in unlimited fashion. FIG. 10 shows eight minimum configurations arrayed into a 16-PE (PEs 00 through 15) system setup.

The memory systems M00, M02, M04, M06, M08, M10, M12 and M14 are arrayed parallelly in the X direction (second direction) of rectangular coordinates established in FIG. 10.

Similarly, the memory systems M01, M03, M05, M07, M09, M11, M13 and M15 are arrayed parallelly in the X direction (second direction) of the rectangular coordinates set up in FIG. 10.

In the Y direction (first direction) of the rectangular coordinates provided in FIG. 10, the memory systems M00 and M01 are positioned symmetrically about the memory interface IF00. The PE00 is located adjacent to the memory system M00 in the Y direction, and the PE01 is positioned adjacent to the memory system M01 in the Y direction. The memory interface IF00 can be arranged to be shared by the memory systems M00 and M01.

In the Y direction (first direction) of the rectangular coordinates, the memory systems M02 and M03 are positioned symmetrically about the memory interface IF01. The PE02 is located adjacent to the memory system M02 in the Y direction, and the PE03 is positioned adjacent to the memory system M03 in the Y direction. The memory interface IF01 can be arranged to be shared by the memory systems M02 and M03.

In the Y direction (first direction) of the rectangular coordinates, the memory systems M04 and M05 are positioned symmetrically about the memory interface IF02. The PE04 is located adjacent to the memory system M04 in the Y direction, and the PE05 is positioned adjacent to the memory system M05 in the Y direction. The memory interface IF02 can be arranged to be shared by the memory systems M04 and M05.

In the Y direction (first direction) of the rectangular coordinates, the memory systems M06 and M07 are positioned symmetrically about the memory interface IF03. The PE06 is located adjacent to the memory system M06 in the Y direction, and the PE07 is positioned adjacent to the memory system M07 in the Y direction. The memory interface IF03 can be arranged to be shared by the memory systems M06 and M07.

In the Y direction (first direction) of the rectangular coordinates, the memory systems M08 and M09 are positioned symmetrically about the memory interface IF04. The PE08 is located adjacent to the memory system M08 in the Y direction, and the PE09 is positioned adjacent to the memory system M09 in the Y direction. The memory interface IF04 can be arranged to be shared by the memory systems M08 and M09.

In the Y direction (first direction) of the rectangular coordinates, the memory systems M10 and M11 are positioned symmetrically about the memory interface IF05. The PE10 is located adjacent to the memory system M10 in the Y direction, and the PE11 is positioned adjacent to the memory system M11 in the Y direction. The memory interface IF05 can be arranged to be shared by the memory systems M10 and M11.

In the Y direction (first direction) of the rectangular coordinates, the memory systems M12 and M13 are positioned symmetrically about the memory interface IF06. The PE12 is located adjacent to the memory system M12 in the Y direction, and the PE13 is positioned adjacent to the memory system M13 in the Y direction. The memory interface IF06 can be arranged to be shared by the memory systems M12 and M13.

In the Y direction (first direction) of the rectangular coordinates, the memory systems M14 and M15 are positioned symmetrically about the memory interface IF07. The PE14 is located adjacent to the memory system M14 in the Y direction, and the PE15 is positioned adjacent to the memory system M15 in the Y direction. The memory interface IF07 can be arranged to be shared by the memory systems M14 and M15.

The accessible range of the bus mapped memory will now be described in reference to FIG. 10.

Each PE may have direct access to two memory banks positioned longitudinally (in Y direction, or first direction) and to the memory banks laterally adjacent to these two memory banks. That is, each of PE00, PE01, PE14, and PE15 at the extreme lateral ends of the memory bank array (in X direction, or second direction) has four directly accessible memory banks; the other PEs 02 through 13 each have six directly accessible memory banks.

The memory banks of the other memory systems are accessed by each EP using a common lateral bus CBSL. The common lateral bus CBSL may in turn be accessed via the DMA controller. The use of the common lateral bus CBSL allows every EP to have indirect access to all memory banks.

When the common lateral bus CBSL is utilized, the frequency band of the bus structure can be limited due to the concentration of access attempts from all PEs 00 through 15.

However, in a multi-processor environment made up of many PEs, it is rare for each PE to access all memory areas. In most cases, each PE handles the task it is assigned by gaining access only to limited memory regions.

In that sense, the above structure constitutes a system that makes the most of the multi-processor environment, ensures scalability and reduces the use of wiring resources.

Described below in reference to FIGS. 11 and 12 is how the bus mapped memory is typically wired.

As mentioned above, the buses are laid out over the memory systems (memory banks). The memory systems (banks) thus wired fall into two types: "even" and "odd" banks.

There exists a bottom layer that is common to all memory systems; the top bus portions divide the memory systems into the "even" and "odd" banks. The two types of memory banks are alternated laterally when installed.

The distinction between "even" and "odd" resides in where the lateral wiring is located. In this system, as discussed above, each PE can have access to adjacent memory banks positioned laterally (in X direction). The bus segments for moving data laterally from one memory bank to another would physically collide if they were located in the same position on two adjacent banks. Where the bus structure is made up of "even" and "odd" segments, they do not collide between adjacent memory banks.

The foregoing description was about the basic constitution of the typical memory device according to the invention. There may be many other variations depending on how buses are wired.

One such variation is a system in which buses are shared for access to the opposite side of the memory interfaces. In this case, the area necessary for the wiring is reduced.

Another variation, as shown in FIGS. 11 and 12, involves implementing a system that incorporates a plurality of read and write blocks. This setup helps improve bus performance.

In FIG. 11, reference numeral 30 stands for selectors, 40 for read ports, 50 for write ports, and 60 for data flows. Any one of the variations above may be adopted depending on the acceptable cost of the system to be implemented and on the performance required by the user.

As described above, one embodiment of the present invention is a shared memory device including: a plurality of processor elements PE 12-0 through 12-15; a plurality of memory modules 14-0 through 14-63 configured to be accessible by the plurality of processor elements; and a connection device 13 configured to enable a specific processor element out of the plurality of processor elements to access a specific memory module out of the plurality of memory modules; wherein the plurality of processor elements are allowed to access via the connection device a plurality of memory systems M0 through M15 each constituted by at least one memory module; and wherein each of the plurality of memory systems accessible by different processor elements allows the plurality of memory modules to be partially shared and accessed by the different processor elements. Preferably, the shared memory device may further include an arbitration circuit 15 configured to prioritize simultaneous requests from a plurality of processor elements to access any one memory module and to let the requesting processor elements access the memory module in question in the prioritized order. These arrangements offer the following major effects:

When any working memory module used by PEs is appropriated for data transfer between the PEs, the memory modules for communication purposes may be reduced. All that needs to be done is to change the direction of access to the memories. The time needed for communication is thus made close to zero.

When the number of PEs is raised, the amount of connecting resources between the PEs and the memories increases linearly with regard to the PE count. This makes it possible to install scalably as many PEs as needed.

Where all PEs can have access to all memory modules, benefits may appear to be disproportionately few despite the substantial amount of utilized resources. The above-described embodiment, however, involves arbitration of limited attempts of access by PEs to memories. This makes it simple to arbitrate the contentious attempts of access by the PEs to any one memory.

The present invention may also be applied to the bus mapped memory and the advantages are likewise significant.

That is, the system configuration is perfectly scalable.

The amount of wiring and power dissipation, two factors likely to increase when the number of configured PEs has grown, can be reduced.

The frequency band does not drop even when the number of PEs is raised.

It should be understood by those skilled in the art that various modifications, combinations, sub-combinations and alterations may occur depending on design requirements and other factor in so far as they are within the scope of the appended claims or the equivalents thereof.

What is claimed is:

1. A shared memory device comprising:
a plurality of processor elements;
a plurality of memory modules configured to be accessible by said plurality of processor elements wherein the plurality of memory modules includes intervening even and odd memory modules;
a partially overlapped multi-port connection device configured to enable a specific processor element out of said plurality of processor elements to access a specific memory module out of said plurality of memory modules and configured to enable a processor element other than said specific processor element, from said plurality of processor elements, to access other memory modules out of said plurality of memory modules, such that the partially overlapped multi-port connection device partially shares and accesses said specific memory module and other memory modules out of said plurality of memory modules;
wherein said plurality of processor elements are allowed to access via said connection device a plurality of memory systems such that each memory system is constituted by at least one shared memory module from the plurality of memory modules,
wherein each of the shared memory modules from the plurality of memory modules is configured to be utilized separately by multiple memory systems of the plurality of memory systems, and
wherein each memory system is configured such that the shared memory module contains at least one even memory module and at least one odd memory module;
an arbitration circuit configured to prioritize and grant simultaneous requests from the plurality of processor elements and a controller to access any one of the plurality of memory modules based on a round-robin prioritized order; and
a controller configured to communicate with an external entity and to control access to said plurality of memory modules,
wherein said controller can access all memory modules from the plurality of memory modules via said connection device, and
wherein said controller controls access to said plurality of memory devices by sending a request to transfer data to the arbitration circuit, waiting to receive a permission to transfer data from the arbitration circuit, and communicating with the external entity to perform data transfer after receiving the permission to transfer data from the arbitration circuit.

2. The shared memory device according to claim 1, wherein said plurality of memory systems are structured in such a manner that the processor element other than said specific processor element, from the plurality of processor elements, located adjacent to each other can access the shared memory modules.

3. The shared memory device according to claim 1, wherein the partially overlapped multi-port connection device is configured to expand hierarchically.

4. A shared memory apparatus comprising a plurality of shared memory devices each including:
a plurality of processor elements;

a plurality of memory modules configured to be accessible by said plurality of processor elements wherein the plurality of memory modules includes intervening even and odd memory modules;

a partially overlapped multi-port connection device configured to enable a specific processor element out of said plurality of processor elements to access a specific memory module out of said plurality of memory modules and configured to enable a processor element other than said specific processor element, from said plurality of processor elements, to access other memory modules out of said plurality of memory modules, such that the partially overlapped multi-port connection device partially shares and accesses said specific memory module and other memory modules out of said plurality of memory modules;

a controller configured to communicate with an external entity and to control access to said plurality of memory modules;

wherein said plurality of processor elements are allowed to access via said connection device a plurality of memory systems such that each memory system is constituted by at least one shared memory module from the plurality of memory modules, wherein controllers of said plurality of shared memory devices are connected by a bus arrangement, wherein each of the shared memory modules from the plurality of memory modules is configured to be utilized separately by multiple memory systems of the plurality of memory systems, and wherein each memory system is configured such that the shared memory module contains at least one even memory module and at least one odd memory module; and an arbitration circuit configured to prioritize and grant simultaneous requests from the plurality of processor elements and the controller to access any one of the plurality of memory modules based on a round-robin prioritized order, wherein said controller configured to communicate with the external entity can access all memory modules from the plurality of memory modules via said communication devices, and wherein said controller controls access to said plurality of memory devices by sending a request to transfer data to the arbitration circuit, waiting to receive a permission to transfer data from the arbitration circuit, and communicating with the external entity to perform data transfer after receiving the permission to transfer data from the arbitration circuit.

5. The shared memory apparatus according to claim 4, wherein said plurality of memory systems are structured in such a manner that the processor element other than said specific processor element, from the plurality of processor elements, located close to each other can access the shared memory modules.

6. The shared memory device according to claim 4, wherein the partially overlapped multi-port connection device is configured to expand hierarchically.

7. A shared memory device comprising:
a plurality of processor elements;
a plurality of memory systems made up of a plurality of memory modules accessible by said plurality of processor elements wherein the plurality of memory modules includes intervening even and odd memory modules;

a plurality of interfaces connected to said plurality of processor elements and to said plurality of memory modules;

a partially overlapped multi-port connection device configured to enable a specific processor element out of said plurality of processor elements to access a specific memory module out of said plurality of memory modules and configured to enable a processor element other than said specific processor element, from said plurality of processor elements, to access other memory modules out of said plurality of memory modules, such that the partially overlapped multi-port connection device partially shares and accesses said specific memory module and other memory modules out of said plurality of memory modules;

wherein said plurality of processor elements is configured to access said plurality of memory systems such that each memory system is formed by at least one shared memory module;

wherein bus wiring is mapped over said plurality of memory systems, and wherein each of the shared memory modules from the plurality of memory modules is configured to be utilized separately by multiple memory systems of the plurality of memory systems, and wherein each memory system is configured such that the shared memory module contains at least one even memory module and at least one odd memory module;

an arbitration circuit configured to prioritize and grant simultaneous requests from the plurality of processor elements and a controller to access any one of the plurality of memory modules based on a round-robin prioritized order; and a controller configured to communicate with an external entity and to control access to said plurality of memory modules, wherein said controller can access all memory modules from the plurality of memory modules via said connection device, and wherein said controller controls access to said plurality of memory devices by sending a request to transfer data to the arbitration circuit, waiting to receive a permission to transfer data from the arbitration circuit, and communicating with the external entity to perform data transfer after receiving the permission to transfer data from the arbitration circuit.

8. The shared memory device according to claim 7, wherein said plurality of memory interfaces are located opposite to said plurality of processor elements across said plurality of memory systems;

wherein said plurality of memory modules constituting said plurality of memory systems are parallelly arrayed in a second direction substantially perpendicular to a first direction in which said plurality of memory interfaces are located opposite to said plurality of processor elements; and wherein said plurality of processor elements, said plurality of memory interfaces, and said plurality of memory modules are connected by connection wiring arranged in matrix fashion in said first and said second directions over said plurality of memory systems.

9. The shared memory device according to claim 8, further comprising
a common bus wired in said second direction.

10. The shared memory device according to claim 7, wherein the partially overlapped multi-port connection device is configured to expand hierarchically.

\* \* \* \* \*